June 7, 1955 H. V. ANTRANIKIAN 2,710,309

COLOR TELEVISION SYSTEMS

Filed March 1, 1952

INVENTOR

HAIG VOHRAM ANTRANIKIAN

BY Sawyer & Kennedy

ATTORNEYS

United States Patent Office 2,710,309

Patented June 7, 1955

2,710,309

COLOR TELEVISION SYSTEMS

Haig Vohram Antranikian, Lakewood, N. J.

Application March 1, 1952, Serial No. 274,347

5 Claims. (Cl. 178—5.4)

This invention relates to improvements in color television systems.

More particularly, the invention is concerned with color television systems in which a screen having a cyclically repeated pattern of strips for responding to, or reproducing the red, blue and green or other color components by means of which the color image is formed. In my previous application Serial No. 251,933 filed October 18, 1951, for Color Television Systems, I have disclosed a system of this character, in which the color screen is incorporated in the camera or picture tube itself, and an electronic switching arrangement is provided to insure accurate color tracking. Such a system, while preferable from most points of view, has certain minor disadvantages. For one thing, a special tube is required both in direct view and in projection systems. The present invention permits the use of standard camera tubes and projection picture tubes without change in the tube structure and with only minor alterations in the optical system. It also permits the use of standard direct view picture tubes, with alteration or adaptation which is entirely external to the tube and involves conversion to a projection system.

The present invention is an improvement on that of my said prior application, a separate color screen being used in conjunction with the camera tube or picture tube, or both adaptation of existing transmitters and receivers without replacement of the camera or picture tube is thus provided for and transmission or reception in monotone may still be accomplished as heretofore, whenever desired. Since the systems which have been utilized in actual telecasting to date are of such character that they appear quite clearly to be experimental or transitional, the importance of adaptation as proposed by the present invention will be apparent.

A system embodying the invention in a preferred form will now be described with reference to the accompanying drawing, and the features forming the invention will then be pointed out in the appended claims.

Figure 1:
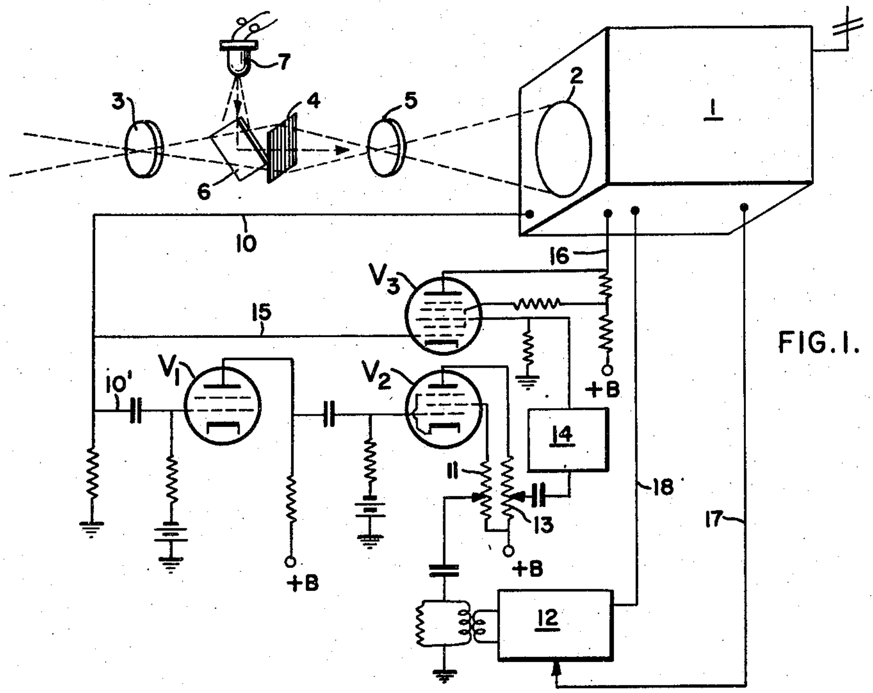
Figures 2, 3:
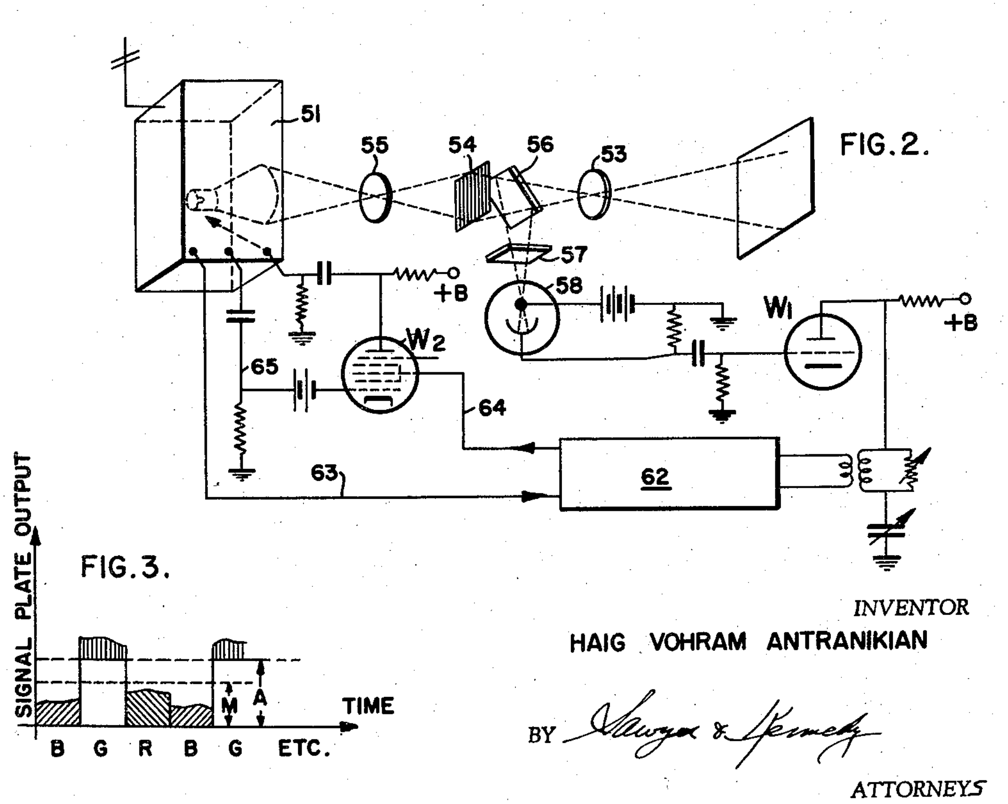

In the drawing, Fig. 1 is a schematic of a transmitter and Fig. 2 is a schematic of a receiver, both embodying the invention in a preferred form and Fig. 3 is a graph illustrating a video signal form which is utilized for synchronizing or tracking the color components.

In Fig. 1 there is indicated at 1 the transmitter generally, the circuits of which may be conventional, except as indicated. The camera tube is exposed through a window 2 and the image to be transmitted is projected thereon by an optical system including lens assemblies indicated diagrammatically at 3 and 5, and a color analyzing screen indicated at 4. A half mirror 6 reflects light from a source at 7 onto the screen 4, superposing on the light from the subject being televised a uniform light for augmenting one of the component colors. The light from the lens assembly 3 and from the augmenting light 7 passes through the translucent screen 4 and is projected onto the photosensitive surface of the camera tube by the lens assembly 5. The thus augmented video output for the selected color component is utilized, in a manner explained below for generating a color synchronizing pulse.

The screen 4 is of a generally familiar type, consisting of a large number of parallel strips of the various color components to be transmitted. The color pattern is repeated cyclically, as, for example; red, blue, green; red, blue, green; etc., so that the screen comprises a number of sets of strips, each set containing a strip corresponding to each of the colors to be produced, and the order of the colors within the various sets being the same. The strips may be of equal widths or may vary somewhat to compensate for parallax effects or the screen may be non-planar to compensate a non-planar photosensitive surface, in the camera tube. The strips for the various colors are conveniently formed of transparent or translucent color filter materials such as used in light filters for color photography. The screen construction is indicated in somewhat more detail in my application above-mentioned and references cited therein, as well as other components of the system about to be described. Only so much of that description is repeated herein as is necessary to an understanding of the present invention.

The video output of the camera tube will have a form as indicated in Fig. 3, it being assumed that the green light is augmented by the light source 7. Maximum video signal level for the image transmitted is indicated at M, and the B and R (blue and red) video output will not exceed this value. The signal level corresponding to the uniform light from source 7 is indicated at A and is preferably selected so as to exceed slightly the maximum image video output M. The green video image signal will be superposed on this uniform signal, as indicated, so that the total green video signal will vary between A and A+M.

The composite video signal is applied through a line 10 to a circuit which is arranged to clip the augmented G signal to produce a color synchronizing pulse and also to subtract a signal of magnitude A from the G signal prior to transmission so as to restore the video signal to proper form for transmission. The signal from line 10 is applied through line 10′ to the control grid of tube V1, which tube is biased to produce a signal only for video outputs exceeding the signal level M. The output of tube V1 is fed to a control grid of tube V2 which is biased to cut-off when the input to tube V1 reaches the level A, the corresponding output voltage developed in the screen grid of this tube (operating as a second anode) is taken off potentiometer 11 and is fed through a suitable network to a color shift and synchronizing circuit indicated in block form at 12. The output from the plate of the tube V2 is taken off a potentiometer 13 and applied through a phase adjusting and wave shaping network indicated in block form at 14 to a control grid of the tube V3. The video signal from line 10 is also applied to a control grid of this tube through a line 15 and the circuit constants are adjusted so that the signal through network 14 and corresponding to the signal level A is subtracted from the green video signal component thus restoring the signal to proper form for transmission by eliminating the effect of the uniform illumination 7. Output of tube V3 is applied to the usual transmitting circuits in the transmitter 1 through a line 16. In addition to the pulse fed to the color shift or synchronizing circuit 12 from the potentiometer 11, the circuit is also supplied through a line 17 with a color shift signal bearing a predetermined relation to a sweep frequency of the camera tube. Suitably phased signals are generated from the pulse corresponding to the green video signal and the pulse corresponding to a sweep frequency for shifting colors in a desired rotation and for switching the video output on and off in synchronism with the scanning of the desired color, as more fully explained in my application above referred to. The system thus provides by use of an external color analysing screen for the breaking down of the image into the corresponding colors to be transmitted and for the synchronizing of the video output transmitted with the passage of the electronic beam across the strips of a desired color. The video signal may, of course, be compressed and expanded, in duration, in the transmission and reception as found desirable.

The receiving system indicated in Figure 2 operates on generally similar principles. There is indicated in that figure, a receiver at 51, together with an optical system comprising lens assemblies indicated diagrammatically at 53 and 55 for projecting the image, and a color analysing screen 54, similar to that described in connection with the transmitter. A half mirror 56 is also employed for reflecting light through a color filter 57 (corresponding in color to the light source 7 of the transmitter) onto a photocell 58. The photocell output is delivered through a tube W1 and associated circuits to a color shifting and synchronizing circuit indicated in block form at 62, which circuit is also supplied through a line 63 with a color shifting pulse related to a sweep frequency as in the case of the transmitter. The output from the circuit 62 is applied through a line 64 to a grid of the tube W2, the video signal being applied to a control grid of this tube through a line 65. The signal through line 64 switches the video output on and off in the desired sequence so that the output of tube W2, which is applied to a control grid or other element of the picture tube, is switched on and off in a manner so as to synchronize the color reproduction in the receiver with the corresponding operation in the transmitter.

The dimensions of the screens 4 and 54 may, as will be apparent, vary considerably according to the optical arrangements utilized without affecting the principle of operation of the invention in any way, and a screen of given dimensions may be adapted to different picture tubes by suitable rearrangements of the optical system. As will be apparent, where monotone transmission or reception is desired, the optical system or only the color analysing screen may be moved out of the way. A widthwise compression of the electron beam may be found desirable so as to produce an image of finer structure, and this may be achieved by simple and obvious adjustments.

While color selection by electronic switching of the video signal has been disclosed, the present invention is not concerned with this phase of the operation of the system, as such, but may be utilized with any desired type of action in controlling the camera or picture tube. Thus, the control may be by acceleration and deceleration of the electron beam speed, as in known systems, or by acceleration and deceleration of the scanning speed as proposed in my application executed January 24, 1952, and also titled Color Television Systems and identified as case A–2116.

A color analyzing screen of the form indicated, and consisting of a large number of parallel filter strips for the various colors is preferred. The system may, however, be applied to color analyzing screens having elemental picture areas for the respective color components which are of any form and arranged in any pattern desired.

While the system has been described with reference to a straight refractive optical system, the invention is not limited to such system but may be applied to reflecting optical systems with or without Schmidt correction, and to mixed reflecting and refracting systems. Also, where the dimensions involved are convenient, the filter screen itself may be viewed directly instead of being projected onto a separate viewing screen. The positioning of the photocell 58 of the receiving set, as also the position of the light source 7 in the transmitter, are largely indifferent, the illumination of the photocell by the filter screen and the illumination of the camera tube by the light source 7 being accomplished by any convenient method of projection or reflection.

The system may, with advantage, in some cases, utilize an optical system of an astigmatic character, and in which the optical components indicated at 53 in the receiving system include a cylindrical component having the cylindrical axis disposed vertically, or at right angles to the line sweep movement, for broadening the strip images projected on the viewing screen, and thus superposing or blending the color images. It will be noted, that the system may thus be used to produce an effect analogous to gravure printing or to color photography where the components for the different colors are stripped and superposed, the different color images being superposed on the receiving screen, or to produce an effect similar to the usual relief color printing and in which the elemental color areas are grouped side by side instead of being superposed, or any desired combination of these effects.

Ordinarily, a filter screen composed of transparent or translucent lines for the various colors will be preferred, the respective lines operating to pass the desired color components. In its broader aspect, however, the invention does not preclude the use of a reflecting color analyzing screen, wherever found convenient.

What is claimed is:

1. In a color television system, the combination with a camera tube having an electron beam and image surface scanned thereby, of an external optical projecting system including a color analyzing screen having a cyclically repeated plurality of sets of elemental picture areas, each set being colored to transmit one of a plurality of color components, and optical elements for focussing an image of the color analyzing screen and the said image surface upon each other, means for uniformly and continuously augmenting the illumination of the color analyzing screen with light of a selected component color, means responsive to the video output for generating a color synchronizing signal corresponding to the scanning of the image of the set of elemental picture areas of the color component which is thus augmented, and electronic switching means responsive to the said signal for controlling the tube to reproduce the color components in predetermined sequence and timed relation to the sweep of the electron beam.

2. The combination according to claim 1, in which the means for generating the color synchronizing signal comprises means for clipping the video output, and comprising also means for thereafter subtracting the video output corresponding to the augmenting illumination from the video signal before transmission thereof.

3. The combination according to claim 1, in which the means for augmenting the illumination with light of a selected color comprises a half mirror associated with the optical elements for passing light forming the image and reflecting the augmenting illumination onto the color analyzing screen.

4. In a color television system and in combination, a camera tube comprising a uniformly coated photosensitive surface and a scanning electron beam producing a video output, an external color analyzing screen having a cyclically repeated plurality of sets of elemental picture areas, each set being colored to transmit one of a plurality of color components, optical elements for focusing an image of the color analyzing screen upon said photosensitive surface, means for continuously and uniformly augmenting the illumination of one selected color component in said image, means responsive to said video output for generating a color registering signal corresponding to the scanning of the image of the set of elemental picture areas of the color component which is thus augmented, and electronic means responsive to the said color registering signal for controlling the tube to reproduce the color components in timed relation with the scan of the electron beam.

5. In a color television system and in combination, a camera tube comprising a uniformly coated photosensitive surface and a scanning electron beam producing a video output, an external color separating screen, optical elements for forming an image of external objects which is to be transmitted upon said photosensitive surface through said color separating screen, said image being analyzed on the same surface into sets of elemental areas each set corresponding to one of a plurality of component colors, means for uniformly and continuously augmenting the illumination of one selected color component in said image, means responsive to said video output for generating a color registering signal corresponding to the scanning of the image of the set of elemental picture areas of the color component which is thus augmented, and electronic means responsive to the said color registering signal for controlling the tube to reproduce the color components in timed relation with the scan of the electron beam.

References Cited in the file of this patent

UNITED STATES PATENTS

| | | |
|---|---|---|
| 2,530,431 | Huffman | Nov. 21, 1950 |
| 2,545,325 | Weimer | Mar. 13, 1951 |
| 2,579,971 | Schade | Dec. 25, 1951 |
| 2,587,074 | Sziklai | Feb. 26, 1952 |